Patented June 12, 1951

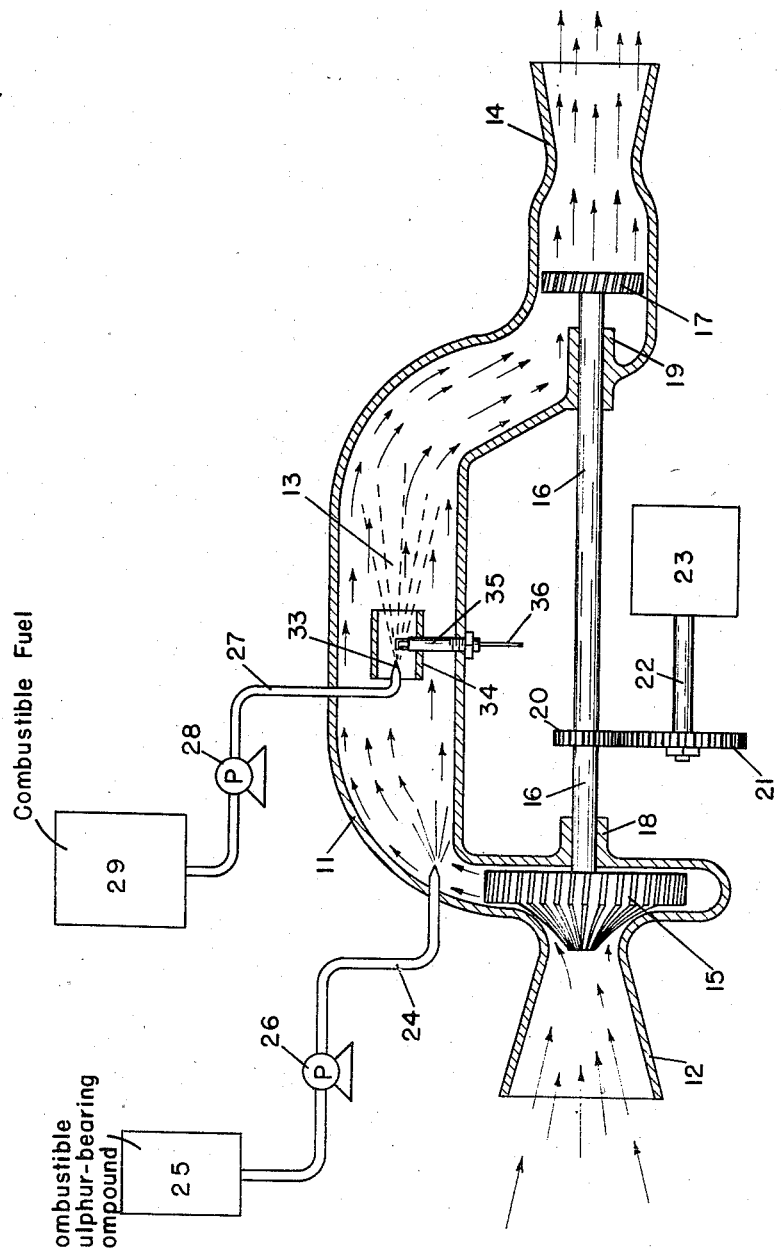

2,557,018

UNITED STATES PATENT OFFICE 2,557,018

SUPPRESSION OF CARBON FORMATION AND CARBURIZATION IN GAS TURBINE AND JET PROPULSION ENGINES

Prentiss S. Viles, Goose Creek, Tex., assignor, by mesne assignments, to Standard Oil Development Company, Elizabeth, N. J., a corporation of Delaware Application April 26, 1946, Serial No. 665,340

7 Claims. (Cl. 60—35.6)

The present invention is directed to the operation of gas turbine power plant jet propulsion engines and similar types of power generation equipment. More particularly, the invention is directed to the suppression of carburization and carbon formation in apparatus in which combustion takes place in a zone at a high temperature in the presence of large amounts of oxygen.

Recently the gas turbine type of power plant and the jet propulsion engine employing the turbine principle have been employed in supplying power to fixed installations or to aircraft. In the aircraft jet engine the turbine principle is employed with the jet to give a forward thrust to the aircraft.

One of the major limitations on the operational life of aircraft type jet engines is the carbon formation during the combustion reaction and the subsequent fouling or plugging of integral operating parts such as the fuel jet nozzle, etc. It is also known that the heat resisting qualities of the structural metals, such as combustion gas turbine blades, etc. limit the operating temperatures of gas turbine power plants. Since the efficiency of this type of power plant is directly proportional to the temperature of the combustion gas as it enters the turbine the heat resisting qualities of the structural metals are of major importance. It is postulated that the heat resisting qualities of the structural metals are related to their carburization qualities. In other words, alloys which carburize readily under the operating conditions fail more rapidly because the products of carburization, i. e., metallic carbides are less resistant than the alloys and are removed allowing the exposure of fresh metal surface for additional carburization. Successive cycles of this type of reaction result in the loss of sufficient metal to cause failure of the metallic part. It is known that ferrous metals and their alloys are excellent carburization agents and catalysts for carbon formation in the presence of high temperatures and hydrocarbons. In view of the potentialities of the exhaust gas turbine power plants and the importance of the above-mentioned limitations, any process which will alleviate or moderate these will be a major improvement in the operation of this type of power plant.

It is, therefore, the main object of the present invention to provide a method whereby the carbon formation and deposition in the combustion chamber and its attendant parts of gas turbine and jet propulsion engines are substantially eliminated. In addition, the method provides for the elimination of the carburization of the metallic parts thereby improving the heat resisting qualities of these parts which in turn allows an increase in the temperature of the combustion gases.

In accordance with the present invention, carbon formation and carburization of the structural metals employed in gas turbine and jet propulsion engines and the degradation of operating life of the metals employed in these types of engines are substantially eliminated by the injection into the combustion chamber of minor amounts of sulfur compounds which may be termed "non-metal sulfides" and may be illustrated by hydrogen sulfide, the alkyl and aryl mercaptans, such as butyl, benzyl, and phenyl mercaptans, and organic sulfides, such as carbon disulfide, the alkyl and aryl sulfides and disulfides, such as ethyl disulfide and the like.

The present invention will be better understood from the following detailed description of the drawing in which the sole figure represents a sectional side view of one embodiment of apparatus adapted for use in the practice of my invention.

Turning now to the drawing, the numeral 11 designates a housing which comprises an inlet 12, a combustion chamber 13, and a nozzle 14. Rotary compressor 15 is placed at the back portion of inlet 12 and is attached to a shaft 16. The other end of shaft 16 is connected to turbine 17. Shaft 16 is supported in housing 11 by means of bearings 18 and 19 and contains gear 20 rigidly affixed thereto. Gear 20 meshes with gear 21, the latter gear being connected to shaft 22 of motor 23.

Housing 11 contains two inlet lines having nozzles opening into the area defined by the housing. Inlet line 24 containing pump 26 is connected to tank 25. Inlet line 27 containing pump 28 is attached to fuel tank 29. Inlet line 27 having at its lower end nozzle 33 leads into a cylindrical chamber 34 open at both ends. An ignitor 35, such as an electric glow plug, leads from the exterior of housing 11 to the interior of chamber 34. Ignitor 35 may be connected to a suitable source of electric current through leads 36.

Tank 29 may contain a suitable combustible fuel, such as a hydrocarbon fraction having a boiling range of 250° to 500° F. The fuel may contain up to about 5 volume per cent of a combustible sulfur-bearing compound of the type heretofore described. Tanks 25 and 32 may contain a concentrate of one or more of the combustible sulfur-bearing compounds heretofore mentioned in a suitable organic solvent such as a hydrocarbon fraction, or the tanks may contain the liquid sulfur compounds in substantially purified form providing they may be maintained in liquid form in the tanks.

In operating the gas turbine, shaft 16 is first rotated by turning on motor 23 and actuating the shaft through the train of gears, such as 20 and 21. The rotation of shaft 16 in turn causes rotary compressor 15 to rotate and draw air or other oxygen-containing gas into combustion chamber 13. The rotary compressor has the effect of drawing in extremely large quantities of the oxygen-containing gas and compressing it to a pressure above the pressure of the gas on the exterior of the turbine. Pump 28 is then switched on and fuel is pumped through line 27 and jet 33 into the compressed gasiform material in combustion zone 13. The fuel is substantially atomized into a fine spray at jet 33 such that it will be thoroughly contacted with the oxygen. Ignitor 35 is heated such that the fuel burns in the presence of the oxygen which results in heating all of the gases in the combustion zone and tremendously increasing the volume thereof. The combustion gases leaving the combustion zone comprise the combustion products of the burning operation and the unreacted, heated constituents of the gaseous mixture introduced through inlet 12. The combustion gases force their way at a high velocity through turbine 17 causing it to rotate at a high speed and issue from nozzle 14 at an extremely high velocity.

The rotation of turbine 17 caused by the passage of the combustion gases therethrough causes rotary compressor 15 to revolve and draw oxygen-containing gas into the combustion zone. After the operation has been started, motor 23 can be switched off and the turbine will continue to drive compressor 15 as long as the burning operation continues. Since the temperature in combustion zone 13 is sufficiently high after the operation has begun to cause spontaneous combustion of the fuel sprayed into the zone, ignitor plug 35 may be switched off.

Carbon formation tends to be most objectionable around the tips of jet 33, on the walls of housing 34, on the inner walls of housing 11 in the area where the combustion takes place, and on the blades of turbine 17. Therefore, if desired, the combustible non-metallic sulfide may be sprayed through line 24 into the incoming compressed gas passing into the combustion zone so that the sulfide will contact all areas where the carbon forming and carburization tendencies are greatest. Another method which is usually most beneficial is to add the non-metallic sulfide to the fuel contained in tank 29 and spray this material along with the fuel into jet 33 and into combustion chamber 15. This procedure provides adequate protection for the areas affected to the greatest extent and particularly reduces carbon formation and carburization of the nozzle of jet 33 and the walls of the combustion chamber. Obviously, any one or any two of the various procedures for injecting the sulfide may be employed in the practice of my invention. My invention is not restricted to the methods by or points at which the sulfide is injected but rather lends itself to any adequate means for introducing the sulfide into the various affected areas in order to prevent carbon formation and carburization of the metallic parts.

It will be observed that the complete cycle taking place in the operation of the turbine comprises intake of oxygen-containing gas, compression of the gas, combustion of the fuel, and the production of a jet. These cycles provide a continuous process as contrasted to the typical semi-continuous cycles taking place in internal combustion engines. Although I have described only one modification employing the gas turbine principle, it will be understood that my invention is applicable to any of the various types of gas turbine plants or jet propulsion engines involving the principles heretofore described.

In explanation of the advantages obtained from the practice of the present invention it is postulated that the carbon formation and carburization of metal heretofore occurring in the combustion zone are not due entirely to the simple "coking" or destructive distillation of the hydrocarbon fuel but at least in part are the result of the catalytic effect of the ferrous metals or alloys present during the combustion reaction. It is believed that the maintenance of sulfur compounds in the combustion zone in accordance with the present invention poisons the catalytic effect of ferrous metals and alloys within the combustion chamber thus retarding the formation of metallic carbides which in turn suppresses the loss of metal from the combustion chamber due to the combustion reaction. It is to be understood, however, that the above hypothesis is given by way of explanation and is not intended to limit the field of the invention being claimed. These materials or any mixture of these materials with each other or with the fuel may be injected with the incoming air, with the incoming fuel, or directly into the combustion chamber. A suitable jet fuel having the above-mentioned desirable properties comprises a major amount (not less than 95 volume per cent) of a hydrocarbon fraction having an approximate boiling range of 250° F. to 500° F. and a minor amount (not more than 5 volume per cent) of a combustible sulfur bearing compound. The combustible sulfur-bearing compound should be used in an amount at least 0.1% by volume based on the unburned hydrocarbon.

The sulfur-containing compound may be injected separately into the combustion chamber with the air or as part of the fuel or may be forced into the chamber as a separate stream. If desired, a solution of the sulfur-containing compound in a volatile combustible organic solvent may be used.

The nature and objects of the present invention having been fully described and illustrated, what I wish to claim as new and useful and to secure by Letters Patent is:

1. A method for suppressing carbon formation on and carburization of attendant metallic parts in gas turbine and jet propulsion engine combustion zones during operation thereof, said operation including continuously introducing compressed oxygen-containing gas and hydrocarbon fuel into a combustion zone, igniting said fuel to form combustion gases and jetting said combustion gases through at least one rotatable turbine and an outlet, in which between 0.1 and 5.0% by volume based on the unburned hydrocarbon fuel of a combustible non-metal sulfide is continuously introduced as a separate stream into said zone.

2. A method in accordance with claim 1 in which the non-metal sulfide is hydrogen sulfide.

3. A method in accordance with claim 1 in which the non-metal sulfide is a mercaptan.

4. A method in accordance with claim 1 in which the non-metal sulfide is an organic sulfide.

5. A method in accordance with claim 1 in which the non-metal sulfide is carbon disulfide.

6. A method for suppressing carbon formation on and carburization of attendant metallic parts in gas turbine and jet propulsion engine combustion zones during operation thereof, said operation including continuously introducing compressed oxygen-containing gas and combustible hydrocarbon fluid into a combustion zone, igniting said fluid to form combustion gases and jetting said combustion gases through at least one rotatable turbine and outlet, in which 5.0% by volume of carbon disulfide based on said fluid is continuously introduced as a separate stream into said zone.

7. A method for suppressing carbon formation on and carburization of attendant metallic parts in gas turbine and jet propulsion engine combustion zones during operation of said engines, said operation including continuously introducing compressed oxygen-containing gas and a liquid hydrocarbon boiling in the range of 250° to 500° F. into a combustion zone, igniting said hydrocarbon to form combustion gases, and jetting said combustion gases through at least one rotatable turbine and outlet, in which between 0.1 and 5.0% by volume based on said unburned hydrocarbon of a combustible, non-metal sulfide selected from the group consisting of hydrogen sulfide, alkyl and aryl mercaptans, carbon disulfide, alkyl and aryl sulfides and disulfides, and their mixtures is continuously introduced as a separate stream into said zone.

PRENTISS S. VILES.

REFERENCES CITED

The following references are of record in the file of this patent:

UNITED STATES PATENTS

| Number | Name | Date |
|---|---|---|
| 1,230,924 | Rice | June 26, 1917 |
| 1,310,985 | Ellis et al. | July 22, 1919 |
| 2,033,877 | Burk | Mar. 10, 1936 |
| 2,206,594 | Berger et al. | July 2, 1940 |
| 2,230,817 | Shoemaker | Feb. 4, 1941 |
| 2,396,911 | Anxionnaz et al. | Mar. 19, 1946 |